(12) United States Patent
Dam et al.

(10) Patent No.: US 6,771,987 B1
(45) Date of Patent: Aug. 3, 2004

(54) METHOD AND APPARATUS FOR UPLINK SCHEDULING

(75) Inventors: Henrik Dam, Copenhagen (DK); Magnus Berg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 552 days.

(21) Appl. No.: 09/696,964

(22) Filed: Oct. 27, 2000

(30) Foreign Application Priority Data

Oct. 28, 1999 (EP) ............................................ 99850159

(51) Int. Cl.$^7$ ................................................ H04B 1/38
(52) U.S. Cl. ................ 455/562.1; 455/561; 455/452.1; 370/534
(58) Field of Search ................................ 455/562, 450, 455/452, 509, 436, 516, 278.1, 423, 67.1, 70, 63, 525, 434, 438, 443, 464, 445, 515, 575.1, 63.4, 550.1, 65, 456.2, 422.1, 456.3, 456.5, 455, 435.3, 561, 440, 562.1, 452.1, 437, 452.2; 370/329, 330, 347, 345, 442, 336, 331, 332, 334, 341, 534; 342/368, 371, 372, 457, 360, 365, 359, 367; 343/834, 836, 837, 853, 893, 854

(56) References Cited

U.S. PATENT DOCUMENTS

| | | | | |
|---|---|---|---|---|
| 4,926,421 A | * | 5/1990 | Kawano et al. ............. | 370/95.1 |
| 5,894,598 A | * | 4/1999 | Shoki ....................... | 455/562.1 |
| 6,151,513 A | * | 11/2000 | Petry et al. ............... | 455/562.1 |
| 6,259,791 B1 | * | 7/2001 | Moore ........................ | 380/271 |
| 6,330,459 B1 | * | 12/2001 | Crichton et al. ............ | 455/562 |
| 6,356,759 B1 | * | 3/2002 | Mustajarvi .................. | 455/450 |
| 6,449,484 B1 | * | 9/2002 | Grubeck et al. ............ | 455/450 |
| 6,501,745 B1 | * | 12/2002 | Turina et al. ................ | 370/337 |
| 6,532,225 B1 | * | 3/2003 | Chang et al. ................ | 370/341 |
| 6,597,927 B1 | * | 7/2003 | Eswara et al. .............. | 370/334 |
| 2001/0056560 A1 | * | 12/2001 | Khan et al. .................. | 714/746 |
| 2002/0086708 A1 | * | 7/2002 | Teo et al. .................... | 455/561 |

* cited by examiner

Primary Examiner—Edward F. Urban
Assistant Examiner—C. Chow

(57) ABSTRACT

The present invention relates to methods for performing uplink scheduling of packet data when using adaptive antennas. In the solution according to the invention the uplink scheduling information is transmitted in an antenna beam towards the mobile for which the scheduling information is intended and by allocating mobile stations with similar position to the same packet data channel. All other data packets are transmitted in an antenna beam towards the mobile station for which the data are intended. By adopting the proposed solution it is possible to efficiently use adaptive antennas in a system carrying e.g. GPRS/EGPRS traffic. The carrier to interference gain introduced by adaptive antennas produces a pronounced increase in system performance.

8 Claims, 2 Drawing Sheets

METHOD AND APPARATUS FOR UPLINK SCHEDULING

This application clams priority under 35 U.S.C. §§ and/or 365 to 99850159.7 filed in Europe on Oct. 28, 1999; the entire content of which is hereby incorporated by reference.

TECHNICAL FIELD OF THE INVENTION

The present invention relates generally to methods for using adaptive antennas in cellular mobile telephone systems, and more particularly the invention relates to a method for performing uplink scheduling of packet data when using adaptive antennas.

The invention also relates to an arrangement for carrying out the method.

BACKGROUND OF THE INVENTION

It is anticipated that a large part of the future growth of wireless communication will be data traffic. Due to the "burstiness" of data traffic, the spectrum is more effectively used if the users share a common resource. An efficient way of sharing a resource is to use packet data. Thus, a great effort has been made in standardising a protocol for transmitting packet data in a GSM mobile communication network. This protocol is called GPRS (General Packet Radio Service) with future enhancements in EGPRS (Edge GPRS).

The GPRS protocol enables more than one mobile station to use the same timeslot or timeslots. This is done by time multiplexing users on the same radio resource. When starting a transmission the mobile station is assigned one or more timeslots in up- and downlink. In the assignment the mobile stations are given a temporal bit flow identity (TFI) and an uplink state flag (USF). The TFI is attached to the data blocks in order to identify the terminating mobile station of the transmitted block. In the downlink all mobiles are listening to the assigned timeslots and try to decode all blocks but only considers the blocks with corresponding TFI's.

The preferred method for scheduling the uplink is to use the USF, which is attached to user data in a downlink block. A mobile station is allowed to transmit an uplink block on a following time slot or a number of following timeslots if it detects its USF in the corresponding downlink block. This method is called dynamic assignment. Another method for scheduling the uplink is to use an entire downlink block, i.e. when a mobile station is signalling uplink channel request, the reply from the network is a bitmap telling the mobile station what timeslots in what TDMA-frames the mobile station should use. The bitmap is transmitted to the mobile station in a dedicated data block. This method is called fixed assignment.

Adaptive antennas, here defined to be an antenna system that is able to change its characteristics to changes in the network, have several interesting properties. One of the most important features of an adaptive antenna system is that the base station is able to detect the direction to the mobile station and can thus transmit dedicated information in an antenna beam towards a desired mobile station. An antenna beam is defined as any signal transmission deliberately covering only a part of a cell, and a cell is defined as the total coverage area of a base station. This implies that the downlink signal is not transmitted in the entire cell resulting in lower interference in the system. Adaptive antennas have been shown to increase the system downlink C/I as much as 6 dB compared to a regular system using sector-antennas.

The interference level generally determines the channel reuse patterns. Because the interference level is reduced a channel reuse pattern can be formed in which channels are reused more frequently, thus increasing the capacity of the network. If the reuse pattern is left unchanged the C/I of the communication links is increased. Thus, the reduced downlink interference can be used either for increasing the number of users in the system or for increasing the C/I of the communication links.

The increased C/I of the communication links can in its turn be used to produce a significant throughput increase in a system carrying GPRS/EGPRS traffic. This is mainly due to link adaptation, which transforms communication link improvements into a throughput increase. In EGPRS a number of different coding schemes and two modulation methods are used to ensure maximum throughput at the current communication link quality C/I, i.e. the payload per transmitted data block varies with the quality of the communication link. A communication link having high quality can be used for a higher data transmission rate either by applying higher modulation or lower coding. Thus, it is obvious that there is a large potential in applying adaptive antennas in systems carrying GPRS/EGPRS traffic.

However, a problem exists with uplink scheduling when using adaptive antennas since user data and scheduling information usually terminates at different mobile stations. If the mobile stations are spatially separated there is a problem transmitting in an antenna beam since communication is optimised for only one of the mobile stations.

One possible solution of scheduling the uplink is found in WO-99/41918, which is especially advantageous with adaptive antennas, when all radio blocks on the downlink transmissions do not have to be broadcast to all users on a certain channel. Two possibilities are discussed first to use fixed allocation where the initial setup signalling specifies when users are allowed to transmit on the uplink. The second possibility is to transmit the scheduling information on a broadcast channel so that it is certain that the correct mobile station receives the scheduling information and transmit all other data blocks in antenna beams to the mobile stations for which the data is intended.

Another possible solution of forming antenna beams, which permit other remote communication stations to detect the communication signals transmitted to a selected remote station, is described in WO-98/33233. More particularly the document solves the problem by using at least two antenna beams active at the same time to also cover mobile stations for which the transmission is not intended. The purpose is mainly to use the signal energy transmitted in the downlink for enabling complexity reduction in the mobile station and for facilitating the tracking of the downlink signal in a successive timeslot, such as e.g. in D-AMPS (Digital Advanced Mobile Phone System).

The solution according to WO-98/33233 has the disadvantages of having to use two antenna beams active at the same time causing interference and overhead. The main purpose is also not to perform uplink scheduling as in the present invention, but instead to use the signal energy received for, e.g. AGC (Automatic Gain Control) adjustments and for reducing the complexity in the mobile station.

There is a need for flexible and efficient solutions for uplink scheduling when using adaptive antennas.

SUMMARY OF THE INVENTION

The present invention thus provides a solution to the protocol problems concerning how to perform uplink scheduling of packet data when using adaptive antennas.

In the preferred uplink-scheduling mode of GPRS/EGPRS the scheduling information is attached to user data. It is likely that the user data and the scheduling information are terminated at different mobile stations. Hence, if the mobile stations are separated the communication does not reach every intended receiver of the data.

One object of the present invention is thus to provide uplink scheduling of packet data in a radio communication system using adaptive antennas.

Another object of the invention is to reduce the amount of overhead necessary for uplink scheduling of packet data in a communication system with adaptive antennas.

The above mentioned objects are achieved by transmitting the data blocks containing scheduling information in an antenna beam towards the mobile station for which the scheduling information is intended and by scheduling mobile stations with similar position on the same radio resource, i.e. the same Packet Data Channel (PDCH). All other data blocks are transmitted in an antenna beam towards the mobile station for which the data are intended.

In the first embodiment of the invention when the data blocks containing the scheduling information is transmitted in an antenna beam towards the mobile station for which the scheduling information is intended, there is a risk for a larger block error probability at the mobile station for which the data is intended. However, an ARQ (Automatic Request for Retransmission) algorithm ensures that the data block is retransmitted if the mobile station cannot decode it correctly and it is possible to use the data received by the mobile station but not decoded correctly by implementing incremental redundancy.

The embodiments of the invention can preferably be implemented by software code segments, and e.g. be stored in any of the relevant nodes of a mobile communication system, such as a base station, a base station controller, a mobile services switching center, a packet control unit etc.

By adopting the proposed solution it is possible to use adaptive antennas in a system carrying GPRS/EGPRS traffic. The combination of the ARQ scheme and link adaptation of GPRS/EGPRS and the carrier to interference gain introduced by adaptive antennas produces a pronounced increase in system performance.

The term "comprises/comprising" when used in this specification is taken to specify the presence of stated features, integers, steps or components but does not preclude the presence or addition of one or more other features, integers, steps, components or groups thereof.

Although the invention has been summarised above, the method and arrangement according to the appended independent claims 1, 6 and 8 define the scope of the invention. Various embodiments are further defined in the dependent claims 2–5, and 7.

DETAILED DESCRIPTION

Figure 1:
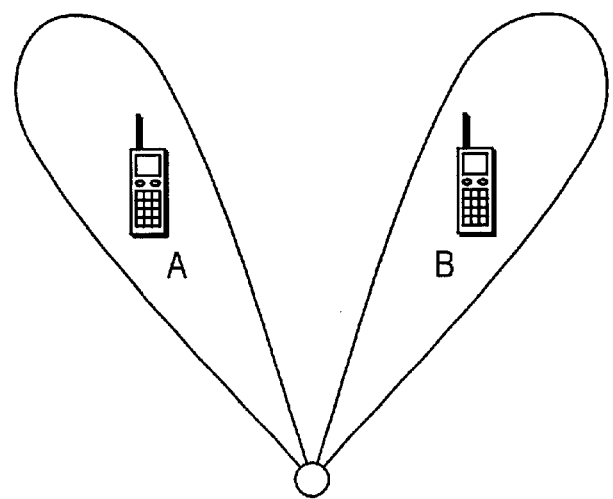
FIG. 1 illustrates the problem of uplink scheduling when the mobile stations are spatially separated.

The present invention describes a method and a system for providing uplink scheduling of packet data in a communication system using adaptive antennas. In the preferred uplink-scheduling mode of GPRS, dynamic assignment, the scheduling information is attached to user data. It is likely that the user data and the scheduling information are terminated at different mobile stations. If the mobile stations A and B are spatially separated as in FIG. 1, the problem is obvious. Suppose that mobile station A is the termination point for the scheduling information and mobile station B is the termination point for user data. Suppose also that the transmission is directed to mobile station B in an antenna beam, then mobile station A can not receive the scheduling information intended for it.

The above problem concerning uplink scheduling is basically solved by transmitting the data blocks containing scheduling information in an antenna beam towards the mobile station for which the scheduling information is intended and by allocating mobile stations with similar positions or with radio paths with similar angle of arrival on the same radio resource, i.e. PDCH. This reduces the number of retransmitted frames since mobile stations for which data and scheduling information is intended are covered by the same antenna beam. The solution will be further described with reference to FIGS. 2–4.

Figure 2:
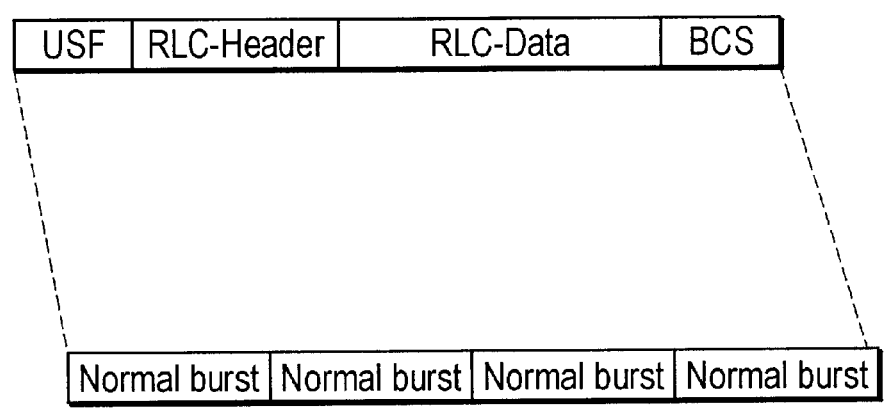
FIG. 2 shows the RLC/MAC-block structure of GPRS.

FIG. 2 shows in detail the radio block structure of the smallest entity in GPRS/EGPRS, the RLC/MAC-block. Each RLC/MAC-block consists of a MAC header, an RLC data block and a block check sequence (BCS). The MAC header comprises an uplink state flag (USF) and the RLC data block consists of an RLC header, containing a block type indicator and power reduction fields, and RLC data. The RLC/MAC-block is channel coded, interleaved and mapped onto four normal GSM bursts. A mobile station thus has to receive all four bursts to receive the RLC/MAC-block. The scheduling information is found in the USF, which gives the corresponding mobile station permission to transmit on the uplink.

Figure 3:
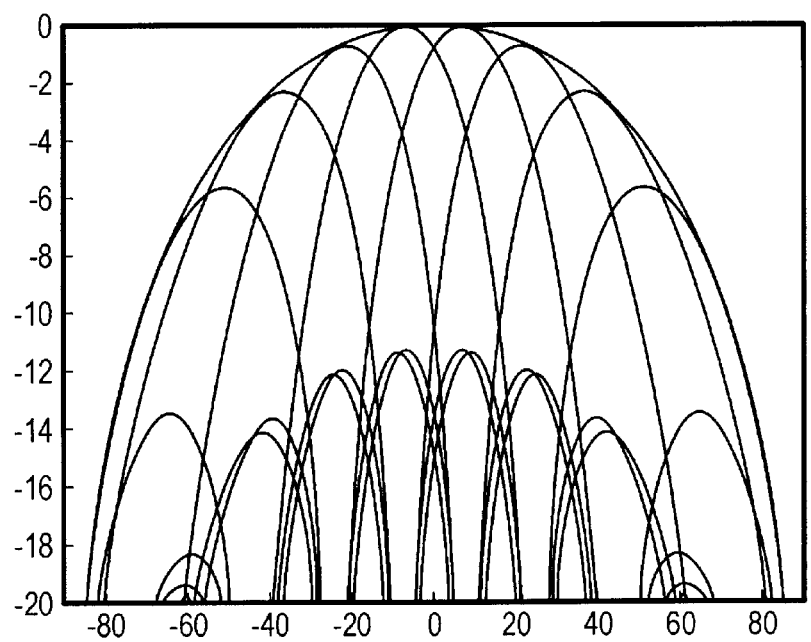
FIG. 3 shows an antenna diagram with directional beams and a sector antenna.

According to the invention data blocks containing scheduling information are transmitted in an antenna beam towards the mobile station for which the scheduling information is intended. Then there is of course a risk for a larger block error probability at the mobile station for which the user data is intended. However, an ARQ (Automatic Request for Retransmission) algorithm ensures that the data block is retransmitted if the mobile station cannot decode it correctly, i.e. when an error in the BCS (Block Check Sequence) is detected. Some of the user data might still reach the mobile station for which it is intended because of radio reflections and side lobes from the main lobes. In FIG. 3 the side lobes can be seen at approximately –14 dB. A further feature of the invention is to use information about the positions of the mobile stations in the scheduling algorithm in order to minimize the number of data blocks transmitted in an erroneous antenna beam. For example mobiles that are not spatially separated should be multiplexed on the same packet data channel (PDCH), i.e. the same timeslot and frequency. This reduces the need for retransmissions, since both scheduling information and user data terminates at mobiles covered by the same antenna beam, and thus the system capacity increases.

Figure 4:
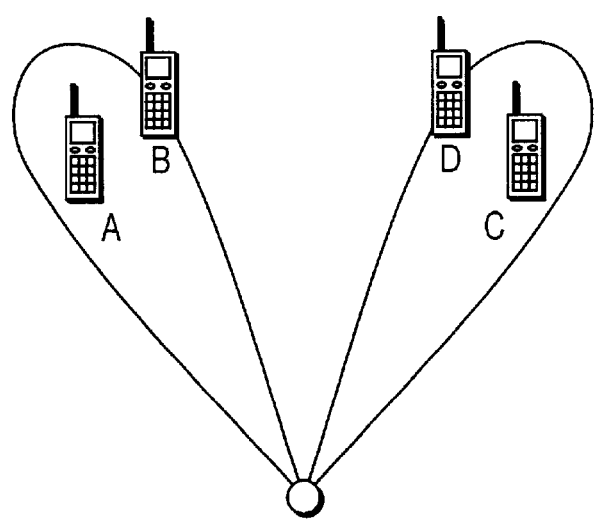
FIG. 4 illustrates the allocation of mobile stations to packet data channels.

More specifically, referring to FIG. 4, a simple example is shown. The figure shows four mobile stations which all have the capability of transmitting and receiving on two timeslots. Mobile stations A and B are clustered together and mobile stations C and D are clustered together. The inventive algorithm would then allocate mobile stations A and B on the same PDCH and mobile stations C and D on the same PDCH.

In a first embodiment of the invention user data received by a mobile station but not decoded correctly can still be used to some extent due to incremental redundancy, i.e. the soft values of the first received frame is used together with the soft values of a retransmitted frame. The retransmitted frame may have been coded in a different way, which further increases the information, thus more data can be correctly decoded.

The invention being thus described, it will be obvious that the same may be varied in many ways. Such variations are not to be regarded as a departure from the scope of the invention, and all such modifications as would be obvious to a person skilled in the art are intended to be included within the scope of the following claims.

What is claimed is:

1. A method for performing uplink scheduling of packet data in a mobile communication system that includes at least one base station transmitting to a plurality of mobile stations within its respective area of coverage, the at least one base station using adaptive antennas, the method comprising:

determining the relative positions of each mobile station in the plurality of mobile stations, allocating mobile stations with similar positions to the same adaptive antenna beam, allocating mobile stations located in the same adaptive antenna beam to the same packet data channel, if a downlink packet contains information for more than one of mobile stations, prioritizing the transmission of information by:

transmitting data blocks carrying scheduling information from the base station in a first narrow antenna beam towards a mobile station for which scheduling information is intended; and transmitting all other data blocks in a second narrow antenna beam towards a mobile station for which user data in the other data blocks are intended.

2. The method of claim 1 wherein the scheduling information is a flag informing a mobile station that it has an uplink radio resource reserved.

3. The method of claim 2 wherein the scheduling information is an uplink state flag.

4. The method of claim 3 wherein the uplink state flag is of granularity 1 or 4.

5. The method of claim 1 further comprising using incremental redundancy when decoding data received in a mobile station for which the user data was intended.

6. A computer program product comprising a computer readable medium, having thereon:

computer program code segments for performing the method of claim 1 when said product is run on a computer.

7. The computer program product according to claim 6 wherein the computer program code segments are stored in a scheduler.

8. A base station for performing uplink scheduling of packet data in a mobile communication system with a plurality of mobile stations in a coverage area of the base station, the base station comprising:

a means for determining the relative positions of each mobile station in the plurality of mobile stations, a means for allocating mobile stations with similar positions to one adaptive antenna beam, a means for prioritizing the transmission of information if a downlink packet contains information for more than one of the mobile stations, the means for prioritizing comprising:

first means for transmitting data blocks carrying scheduling information in a first narrow antenna beam towards one of the plurality of mobile stations for which scheduling information is intended;

second means for transmitting all other data blocks in a second narrow antenna beam towards one of the plurality of mobile stations for which data are intended, and means for multiplexing on a same packet data channel when the mobile stations are covered by the same adaptive antenna beam.

* * * * *